United States Patent
Krishna et al.

(10) Patent No.: US 11,403,123 B2
(45) Date of Patent: Aug. 2, 2022

(54) SUGGESTING ACTIONS BASED ON MACHINE LEARNING

(71) Applicant: Google LLC, Mountain View, CA (US)

(72) Inventors: Golden Gopal Krishna, Berkeley, CA (US); Carl Magnus Borg, San Francisco, CA (US); Miroslav Bojic, San Francisco, CA (US); Henry Owen Newton-Dunn, Mountain View, CA (US); Jacob M. Klinker, Mountain View, CA (US); Mindy Pereira, Santa Clara, CA (US); Devin Mancuso, San Francisco, CA (US); Daniel June Hyung Park, Sunnyvale, CA (US); Lily Sin, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/192,860

(22) Filed: Mar. 4, 2021

(65) Prior Publication Data
US 2021/0208908 A1  Jul. 8, 2021

Related U.S. Application Data

(63) Continuation of application No. 17/027,255, filed on Sep. 21, 2020, now Pat. No. 10,970,096, which is a
(Continued)

(51) Int. Cl.
*G06F 9/451* (2018.01)
*G06N 5/04* (2006.01)
(Continued)

(52) U.S. Cl.
CPC ............... *G06F 9/453* (2018.02); *G06N 5/04* (2013.01); *G06N 20/00* (2019.01); *G06Q 10/10* (2013.01); *G06F 3/0482* (2013.01)

(58) Field of Classification Search
CPC ........ G06F 9/453; G06F 9/451; G06F 3/0482; G06N 20/00; G06N 5/04; G06Q 10/10
(Continued)

(56) References Cited

U.S. PATENT DOCUMENTS 7,503,012 B2  3/2009  Chen et al.
7,801,885 B1  9/2010  Verma
(Continued)

FOREIGN PATENT DOCUMENTS

WO  2019118011  6/2019
WO  2019118022  6/2019
WO  2019125543  6/2019

OTHER PUBLICATIONS

"Final Office Action", U.S. Appl. No. 16/008,021, dated Aug. 17, 2021, 32 pages.
(Continued)

*Primary Examiner* — William D Titcomb
(74) *Attorney, Agent, or Firm* — McDonnell Boehnen Hulbert & Berghoff LLP

(57) ABSTRACT

This document describes techniques for suggesting actions based on machine learning. These techniques determine a task that a user desires to perform, and presents a user interface through which to perform the task. To determine this task, the techniques can analyze content displayed on the user device or analyze contexts of the user and user device. With this determined task, the techniques determine an action that may assist the user in performing the task. This action is further determined to be performable through analysis of functionalities of an application, which may or may not be executing or installed on the user device. With some subset of the application's functionalities determined, the techniques presents the subset of functionalities via the user interface. By so doing, the techniques enable a user to
(Continued)

complete a task more easily, quickly, or using fewer computing resources.

20 Claims, 7 Drawing Sheets

Related U.S. Application Data continuation of application No. 15/974,284, filed on May 8, 2018, now Pat. No. 10,846,109.

(60) Provisional application No. 62/608,270, filed on Dec. 20, 2017.

(51) Int. Cl.
  *G06N 20/00* (2019.01)
  *G06Q 10/10* (2012.01)
  *G06F 3/0482* (2013.01)

(58) Field of Classification Search
  USPC ........................................................ 715/708
  See application file for complete search history.

(56) References Cited

U.S. PATENT DOCUMENTS

| | | | |
|---|---|---|---|
| 8,520,000 | B2 | 8/2013 | Duncker et al. |
| 9,684,546 | B2 | 6/2017 | Peacock et al. |
| 10,013,783 | B1 | 7/2018 | Bhat et al. |
| 10,333,873 | B2 | 6/2019 | Perez et al. |
| 10,620,923 | B2 | 4/2020 | Allan et al. |
| 10,783,013 | B2 | 9/2020 | Krishna et al. |
| 10,846,109 | B2 * | 11/2020 | Krishna ............... G06F 9/453 |
| 10,970,096 | B2 * | 4/2021 | Krishna ............... G06F 9/453 |
| 2007/0156647 | A1 | 7/2007 | Shen et al. |
| 2009/0144262 | A1 | 6/2009 | White et al. |
| 2011/0295847 | A1 | 12/2011 | Cucerzan et al. |
| 2011/0302521 | A1 | 12/2011 | Jiang et al. |
| 2012/0158702 | A1 | 6/2012 | Kumar et al. |
| 2012/0159395 | A1 | 6/2012 | Deutsch et al. |
| 2013/0218836 | A1 | 8/2013 | Sullivan et al. |
| 2013/0326562 | A1 | 12/2013 | Bi et al. |
| 2015/0058318 | A1 | 2/2015 | Blackwell et al. |
| 2015/0128058 | A1 | 5/2015 | Anajwala |
| 2016/0360382 | A1 | 12/2016 | Gross et al. |
| 2018/0060982 | A1 | 3/2018 | Milles et al. |
| 2018/0233141 | A1 | 8/2018 | Solomon et al. |
| 2018/0338231 | A1 | 11/2018 | Johnson |
| 2018/0365899 | A1 | 12/2018 | Wolf et al. |
| 2019/0188013 | A1 | 6/2019 | Krishna et al. |
| 2019/0188059 | A1 | 6/2019 | Krishna et al. |
| 2019/0188322 | A1 | 6/2019 | Krishna et al. |
| 2020/0097708 | A1 | 3/2020 | Thompson |
| 2020/0364099 | A1 | 11/2020 | Krishna et al. |
| 2021/0004247 | A1 | 1/2021 | Krishna et al. |

OTHER PUBLICATIONS

"Foreign Office Action", EP Application No. 18773890.1, dated Oct. 14, 2021, 5 pages.
"Non-Final Office Action", U.S. Appl. No. 16/008,021, dated Nov. 10, 2021, 32 pages.
"Corrected Notice of Allowance", U.S. Appl. No. 15/974,284, dated Oct. 26, 2020, 3 pages.
"Final Office Action", U.S. Appl. No. 15/974,284, 23 Pages.
"Final Office Action", U.S. Appl. No. 16/112,400, dated Feb. 3, 2020, 9 Pages.
"Final Office Action", U.S. Appl. No. 16/008,021, dated Aug. 20, 2020, 26 Pages.
"First Action Interview Office Action", U.S. Appl. No. 16/112,400, dated Sep. 16, 2019, 3 Pages.
"Foreign Office Actio", EP Application No. 18782839.7, dated Feb. 3, 2021, 5 pages.
"International Preliminary Report on Patentability", Application No. PCT/US2018/050701, dated Jul. 2, 2020, 6 pages.
"International Preliminary Report on Patentability", Application No. PCT/US2018/047122, dated Jun. 25, 2020, 12 pages.
"International Preliminary Report on Patentability", Application No. PCT/US2018/050295, dated Jun. 25, 2020, 9 pages.
"International Search Report and Written Opinion", Application No. PCT/US2018/047122, dated Oct. 22, 2018, 17 pages.
"International Search Report and Written Opinion", Application No. PCT/US2018/050295, datedd Nov. 22, 2018, 15 pages.
"International Search Report and Written Opinion", Application No. PCT/US2018/050701, dated Nov. 27, 2018, 12 pages.
"Non-Final Office Action", U.S. Appl. No. 16/008,021, dated Feb. 23, 2021, 30 pages.
"Non-Final Office Action", U.S. Appl. No. 15/974,284, dated Dec. 18, 2019, 18 Pages.
"Notice of Allowance", U.S. Appl. No. 16/112,400, dated May 13, 2020, 8 Pages.
"Notice of Allowance", U.S. Appl. No. 15/974,284, dated Jul. 27, 2020, 6 Pages.
"Notice of Allowance", U.S. Appl. No. 17/027,255, dated Dec. 23, 2020, 7 pages.
"Pre-Interview Communication", U.S. Appl. No. 16/008,021, filed Apr. 30, 2020, 24 Pages.
"Pre-Interview Communication", U.S. Appl. No. 16/122,400, filed Jun. 25, 2019, 3 pages.
"Process Explorer", https://en.wikipedia.org/wiki/Process_Explorer; Retrieved from Internet on Nov. 9, 2018, 3 pages.
Angermann, et al., "Utilizing In-Vehicle Computing Devices to Exchange Information Utilizing In-Vehicle Computing Devices to Exchange Information During a Traffic Stop", Oct. 13, 2020, 7 pages.
Jeffrey-Wilensky, et al., "This police robot could make traffic stops safer", May 9, 2019, 5 pages.
"Corrected Notice of Allowance", U.S. Appl. No. 17/027,255, dated Mar. 12, 2021, 2 pages.
"Foreign Office Action", EP Application No. 18782851.2, dated Jun. 4, 2021, 5 pages.
"Notice of Allowance", U.S. Appl. No. 16/985,935, dated Dec. 10, 2021, 10 pages.

* cited by examiner

600

```
┌─────────────────────────────────────────────────────┐
│ Analyze content that is associated with a window    │
│ occupying a portion of a display of a user device,  │
│ the window associated with a first application with │
│ which a user is interacting                         │
│ 602                                                 │
└─────────────────────────────────────────────────────┘
                          │
                          ▼
┌─────────────────────────────────────────────────────┐
│ Identify, based on the analyzed content, a task     │
│ that is being performed by the user                 │
│ 604                                                 │
└─────────────────────────────────────────────────────┘
                          │
                          ▼
┌─────────────────────────────────────────────────────┐
│ Determine, based on the task, a suggested action to │
│ be performed by the user via a second application   │
│ 606                                                 │
└─────────────────────────────────────────────────────┘
                          │
                          ▼
┌─────────────────────────────────────────────────────┐
│ Determine, based on the suggested action, a subset  │
│ of functionalities of the second application that   │
│ are capable of performing the suggested action      │
│ 608                                                 │
└─────────────────────────────────────────────────────┘
                          │
                          ▼
┌─────────────────────────────────────────────────────┐
│ Present the subset of functionalities through a     │
│ user interface through which to instruct the second │
│ application to perform the subset of functionalities│
│ 610                                                 │
└─────────────────────────────────────────────────────┘
```

FIG. 6

SUGGESTING ACTIONS BASED ON MACHINE LEARNING

RELATED APPLICATION

This application is a continuation of and claims priority to U.S. application Ser. No. 17/027,255, filed on Sep. 21, 2020, which is a continuation application of U.S. application Ser. No. 15/974,284, filed on May 8, 2018, now U.S. Pat. No. 10,846,109, which in turn claims priority under 35 U.S.C. § 119(e) to U.S. Provisional Application Ser. No. 62/608,270, filed on Dec. 20, 2017, the disclosures of which are incorporated by reference herein in their entirety.

BACKGROUND

A user of a computing device often has multiple applications available to him that may assist him to perform a task. However, access to a specific application that may be relevant to a task that the user is actively performing may often be complex and require multiple navigation steps by the user. Furthermore, once the user accesses the specific application, the specific application in itself may be agnostic to details of the task at hand, requiring the user to navigate through multiple additional menus and populate input fields with information relevant to the task.

For example, in one instance, the user may have multiple applications that are concurrently operating on the computing device, where the computing device chronologically arranges respective windows of the multiple applications in a flat list. In order to access the specific application that may be relevant to the task that the user is actively performing, the user may have to flip or scroll through the chronologically arranged windows to find the specific application. As another example instance, if the user does not have the specific application active, he may have to navigate through multiple tiers of icons or file structures of the computing device to locate the specific application. Furthermore, in both example instances, once the user accesses the specific application, he may have to navigate menus of the specific application and manually input data pertinent to performing the task. In general, current techniques that computing devices require for a user to access a specific application to perform a task are inefficient.

SUMMARY

In some aspects, a method is described. The method comprises analyzing content that is associated with a window occupying a portion of a display of a user device, where the window is associated with a first application with which a user is interacting. Based on the analyzed content, a task that is being performed by the user is identified. After identification of the task, a suggested action to be performed by the user via a second application is determined. A subset of functionalities, of the second application and capable of performing the suggested action, are then determined and presented through a user interface through which to instruct the second application to perform the subset of functionalities.

In other aspects, a method is described. The method comprises associating a user to a user device. A context is then determined based on a current time, location, situation, or activity associated with the user and the user device. An analysis is performed to analyze an association between the context and other contexts, where the other context include a prior context associated with the user and the user device or a different context associated with a different user or different user device. Based on the analysis, a predicted action to be performed by the user via a predicted application is determined, from which a subset of functionalities capable of performing the predicted action are determined. The subset of functionalities are then presented through a user interface through which to instruct the predicted application to perform the subset of functionalities.

In yet other aspects, an apparatus is described. The apparatus comprises a display, a processor, and computer-readable storage media storing instructions. Upon execution by the processor, the instructions cause the apparatus to associate a user to the apparatus and determine a context based on a current time, location, situation, or activity associated with user and the apparatus. The apparatus then performs an analysis to analyze an association between the context and other contexts, where the other context comprises a prior context associated with the user and the apparatus or a different context associated with a different user or different apparatus. Based on the analysis, the apparatus then determines a predicted action to be performed by the user via a predicted application, from which a subset of functionalities capable of performing the predicted action are determined. The subset of functionalities are then presented through a user interface and on the display, where the user interface is configured to enable the user to instruct the predicted application to perform the subset of functionalities.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, a reader should not consider the summary to describe essential features nor limit the scope of the claimed subject matter.

DETAILED DESCRIPTION

This document describes techniques for suggesting actions based on machine learning. These techniques determine a task that a user desires to perform, and presents a user interface through which to perform the task. To determine this task, the techniques can analyze content displayed on the user device or analyze contexts of the user and user device. With this determined task, the techniques determine an action that may assist the user in performing the task. This action is further determined to be performable through analysis of functionalities of an application, which may or may not be executing or installed on the user device. With some subset of the application's functionalities determined, the techniques presents the subset of functionalities via a user interface. By so doing, the techniques enable a user to complete a task easily, quickly, or using fewer computing resources.

A limited-function user interface, called a "slice", is described in this document. A slice is a lightweight user interface that offers limited functionalities of an application and that is presented in a portion of a device's display. The slice can present functions through which to perform, quickly and easily, a task through a corresponding action. For example, the slice can contain selectable text or icons that, when selected, cause the device to perform the suggested action, such as launching an application, sending a text message, capturing an image, creating a calendar event, or initiating a phone call.

By determining the suggested actions relevant to the task, a machine-learning module enables the user performing the task to more efficiently and effectively act; the user does not have to flip or scroll through multiple chronologically arrange windows, navigate through multiple tiers of icons or file structures, or manually input data pertinent to performing the task. Instead, the user may easily select a function through a slice or other limited-function user interface, including one in which data pertinent to the task is automatically addressed.

BRIEF DESCRIPTION OF THE DRAWINGS

This document describes details of one or more aspects suggesting actions based on machine learning. The use of the same reference numbers in different instances in the description and the figures may indicate like elements:

FIG. 6 illustrates an example method to present a subset of functionalities associated with a suggested action based on content associated with a window of a display of the user device.

DETAILED DESCRIPTION

Figure 1:
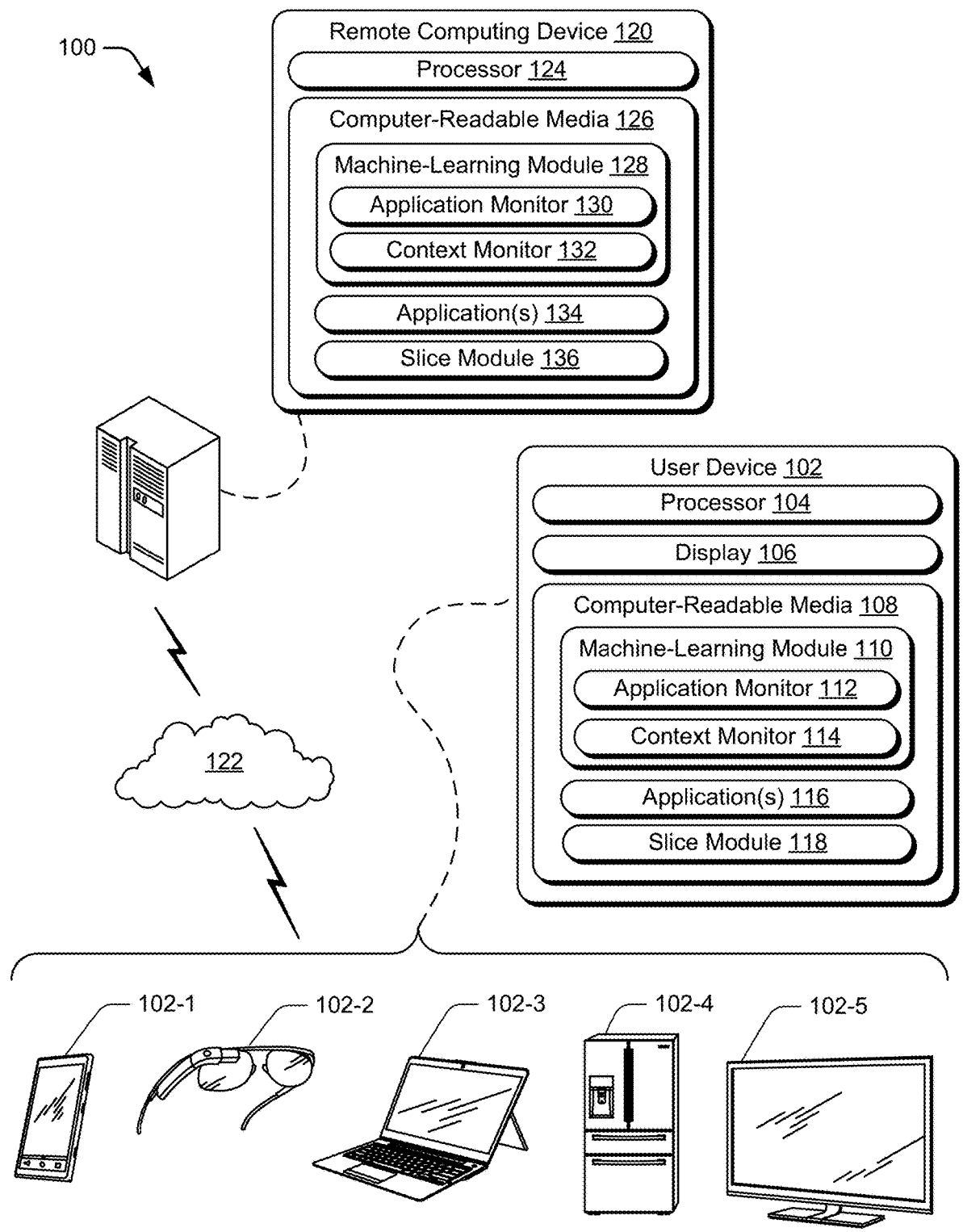
FIG. 1 illustrates an example operating environment in which a user device provides suggested next steps based on machine learning.

FIG. 1 illustrates an example operating environment 100 in which a user device provides suggested actions based on machine learning. The operating environment 100 includes a user device 102. Example configurations of the user device 102 include a smartphone 102-1, computing spectacles 102-2, a laptop 102-3, a smart refrigerator 102-4, and a television 102-5.

The user device 102 includes a processor 104, a display 106, and one or more computer-readable storage media (CRM) 108. In some cases, the processor 104 is an application processor (e.g., multicore processor) or a system-on-chip (SoC) with other components of the user device integrated therein. The CRM 108 may include any suitable type of memory media or storage media, such as read-only memory (ROM), programmable ROM (PROM), random access memory (RAM), static RAM (SRAM), or Flash memory. The CRM 108 may also store modules of code or executable instructions in the form of a machine-learning module 110 (including an application monitor 112 and a context monitor 114), one or more applications 116, and a slice module 118.

While a user is interacting with an application of user device 102 to perform a task (e.g., interacting with an application of the one or more applications 116), the processor 104 may execute code of the machine-learning module 110 to identify a task being performed and determine a suggested action that, if performed via another application (e.g., another application of the one or more applications 116), may help the user perform the task. This may include, for example, executing code of the application monitor 112 to analyze content that is associated with a window occupying a portion of the display 106, such as a window associated with the application of the one or more applications 116 with which the user is interacting. Such content associated with the window may include text content, image content, or audio content. Furthermore, the other application may be dormant, executing in the background, or otherwise unlaunched and, as such, effectively hidden from the user's view.

The processor 104 may also execute code of the machine-learning module 110 to determine a context that may be relevant to a task the user is performing. For example, the processor may execute code of the context monitor 114 to determine a context associated with the user and the user device based on one of more factors related to time, location, situation, or activity. In certain instances, one or more of the factors may be detected by sensors or circuitry that are local to the user device 102, while in other instances one or more of the factors may be communicated to the user device 102.

The context monitor 114 may also include code that, when executed by the processor 104, analyzes an association between the context and other contexts, including a prior context associated with the user and the user device 102 or a different context associated with a different user or a different user device. Executing the code of the context monitor 114 may, from the analysis, determine a predicted action to be performed by the user via a predicted application. The predicted application may be dormant, executing in the background, or otherwise not visible to the user, though this is not required, as the predicted application may be visible and in the foreground.

After determining a respective action and application (e.g., either a suggested action/application or a predicted action/application), the processor 104 may also execute code of the slice module 118. Executing the code the slice module 118 may determine, based on the respective action, a subset of functionalities of the respective application capable of performing the respective action.

This subset of functionalities, via continuing execution of the code of the slice module 118, may then be presented to the user via a user interface that has limited functionality, such as the above-mentioned slice. This slice is a lightweight, limited-function user interface that occupies a portion of the display 106 of the user device 102. In such an instance, presentation of the subset of functionalities provides an interface through which to instruct the respective application to perform the subset of functionalities.

In general, developers may modify code of the one or more applications 116 to be compatible with the slice module 118. Modification of the code of the one or more applications 116 may include, for example, enable serving limited sets of data (managed by the one or more applications 116) to the processor 104, providing access to limited sets of selectable control commands to the processor 104, or the like. Such modifications, in effect, render a limited-functionality application.

In certain cases, the processor 104 may execute code of the slice module 118 to provide varying subsets of functionalities of an application (e.g., one of the one or more applications 116), even including all of the potential functionalities of one of the applications 116. Such cases may depend on the extent to which a developer has modified one of the applications 116 to be compatible with the slice module 118 or completely independent of any modification of the application 116. The slice module 118 may select from various different subsets of functionalities for a user interface, varying from one to many, such as based on available space in the display 106 of the user device 102, available computing power of the user device 102, a number of steps that might be associated with a respective action, or the like.

The operating environment 100 also may include a remote computing device 120 that connects to the user device 102 via a network 122. Connections via the network 122 may include one or more of, for example, a Wi-Fi connection to a Wi-Fi network, a wired connection to Local Area Network (LAN), and a wireless mobile connection to a Global System for Mobile (GSM) network.

Like the user device 102 (e.g., a user device that is local to the user), the remote computing device 120 includes a processor 124 and a computer-readable storage media (CRM) 126. The CRM 126 further stores a machine-learning module 128 (including an application monitor 130 and a context monitor 132), as well as one or more applications 134 and a slice module 136. In certain instances, the processor 124 of the remote computing device 120 may execute stored modules of code or executable instructions of the CRM 126, or portions thereof, to augment or replace functions performed local to the user device 102. In such instances, communications can occur between the remote computing device 120 and the user device 102 via the network 122 in order for the user device 102 to present, via the slice occupying a portion of the display 106 of the computing device, as subset of functionalities presenting an action to the user of the user device 102.

Additionally, and in yet other instances, an application of the one or more applications 134 of the remote computing device 120 may serve as an avatar for an application of the one or more applications 116 local to the user device 102 or be used if the application is only stored in the CRM 126 of the remote computing device 120 and not the CRM 108 of the user device 102. In such instances, subsets of functionalities of an application of the one or more applications 134 may be presented via a slice occupying a portion the display 106 of the user device 102.

Figure 2:
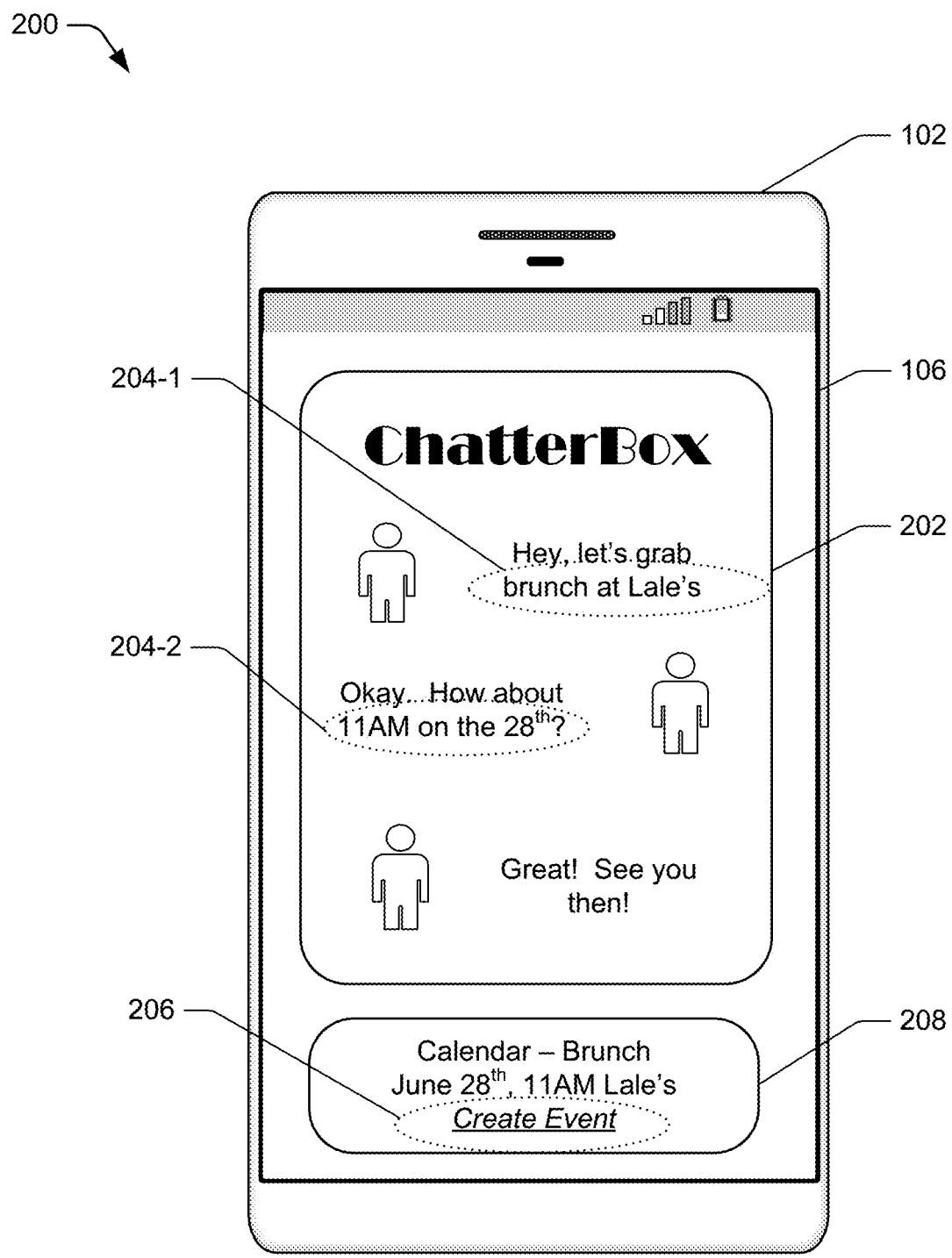
FIG. 2 illustrates an example of details associated with a user device presenting a subset of functionalities associated with a suggested action based on content associated with a window of a display of the user device.

FIG. 2 illustrates an example of details 200 associated with a user device presenting a subset of functionalities associated with a suggested action based on content associated with a window of a display of the user device. The user device may be the user device 102 of FIG. 1. As illustrated, the user device 102 is using machine learning to analyze content associated with the window 202.

As illustrated in the example of FIG. 2, a window 202 associated with an application with which a user is interacting is occupying a portion of the display 106. Furthermore, the application (e.g., a chat application entitled chatterbox), is presenting content in the window 202 in the form of textual communication. To analyze the content, the processor 104 of the user device 102 may execute code stored in the application monitor 112 of the machine-learning module 110. As illustrated, execution of the code analyzes, via text recognition, text content 204-1 and text content 204-2. Based on the analysis, the user device 102 identifies that the user is performing a task of scheduling a brunch at Lale's at 11 AM on the $28^{th}$. In order to assist the user in performing the task, the user device 102 determines a suggested action (e.g., schedule a brunch) to be performed by the user via another application (e.g., a calendar application from the one or more applications 116).

Continuing the example, the processor 104 of the user device 102 executes code associated with the slice module 118 to interface with the calendar application (even if the calendar application is not launched or active) to present the subset of functionalities associated with the suggested action of scheduling brunch. Although the calendar application provides the user with many functionalities (e.g., blocking the user's calendar, scheduling recurring meetings, monthly/weekly views, contact list entries, and the like), the user device 102 determines a subset of functionalities 206 available through the calendar application that are capable of performing the suggested action (e.g., a "create event" functionality). The user device 102 then presents a slice 208 that is formatted to occupy a portion of the display 106 that can overlap, be superimposed over, or is in a portion of the display not occupied by the window 202. In this instance, the suggested action (e.g., scheduling brunch) is presented via the slice 208 presenting a selectable action (e.g., the subset of functionalities 206 of the calendar application corresponding to "create event"). Note also that relevant data that is pertinent to the task is automatically addressed, here not only can the user quickly and easily create an event, but the event has the correct data in it—that of the date, June 28th, the location (Lale's), and the name of the person accompanying the user.

Other examples of analyzing content to generate slices include suggesting that the user purchase tickets to a concert based on analyzing audio and visual content of an application being played by the user (here the application having a window showing a music video of an artist also playing at the concert). Another example is where the machine-learning module 110 suggests, via a limited-function user interface, making a telephone call to a friend based on the friend being tagged or recognized in a social media application (by the user or in an application with which the user is interacting). In such instances, a user may perform tasks in an effective and an efficient manner, without the need to open additional applications or search for a particular application. Note also that the task determined by the techniques may be one that the user is likely to want next, though that task is not necessarily known by the user to be a likely task. Thus, the user may not yet be aware that he wants to create a calendar event or make the call. The machine-learning module 110 may determine this task either way.

Figure 3:
FIG. 3 illustrates example of details associated with a user device presenting a subset of functionalities associated with a suggested action based on a task a user is performing.

FIG. 3 illustrates details 300, which are associated with the user device 102 presenting a subset of functionalities associated with a suggested action based on a task a user is performing. As illustrated in the example of FIG. 3, the user device 102 is using machine learning to present the subset of functionalities associated with the suggested action based on the task the user is performing.

Here the user is performing an example task of composing an email via the Email application executing and presented in a window 302. The processor 104 executes code associated with the application monitor 112 and, analyzing content of the window 302, determines that a grammar cross-check will improve efficacy of the email-writing task. The processor 104 then executes code associated with the slice module 118 to create a slice 304. As illustrated, the slice 304 occupies a portion of the interface 102 other than that occupied by the window 302 of the email application. In this instance, the slice presents a subset of functionalities associated with the suggested action (e.g., perform the grammar corrections), including multiple selectable actions 306-1 and 306-2. This subset of functionalities provides an interface to the grammar application, allowing the user to instruct the grammar application to perform the subset of functionalities. Note that the techniques did not just execute the Grammar Friend application in its entirety. Instead, the relevant data and an appropriate subset of functions were presented.

As illustrated, the slice is a user interface that provides a utility or extension of the grammar application so that the user might improve his efficacy. Other example instances of a slice providing a utility for a task include slices that translate text, covert currency, read text-to-speech, autofill passwords, or provide coupon codes. In such instances, utilities improving efficacy of activities are available to the user without the user needing to manually open additional applications that are extension applications or otherwise.

Figure 4:
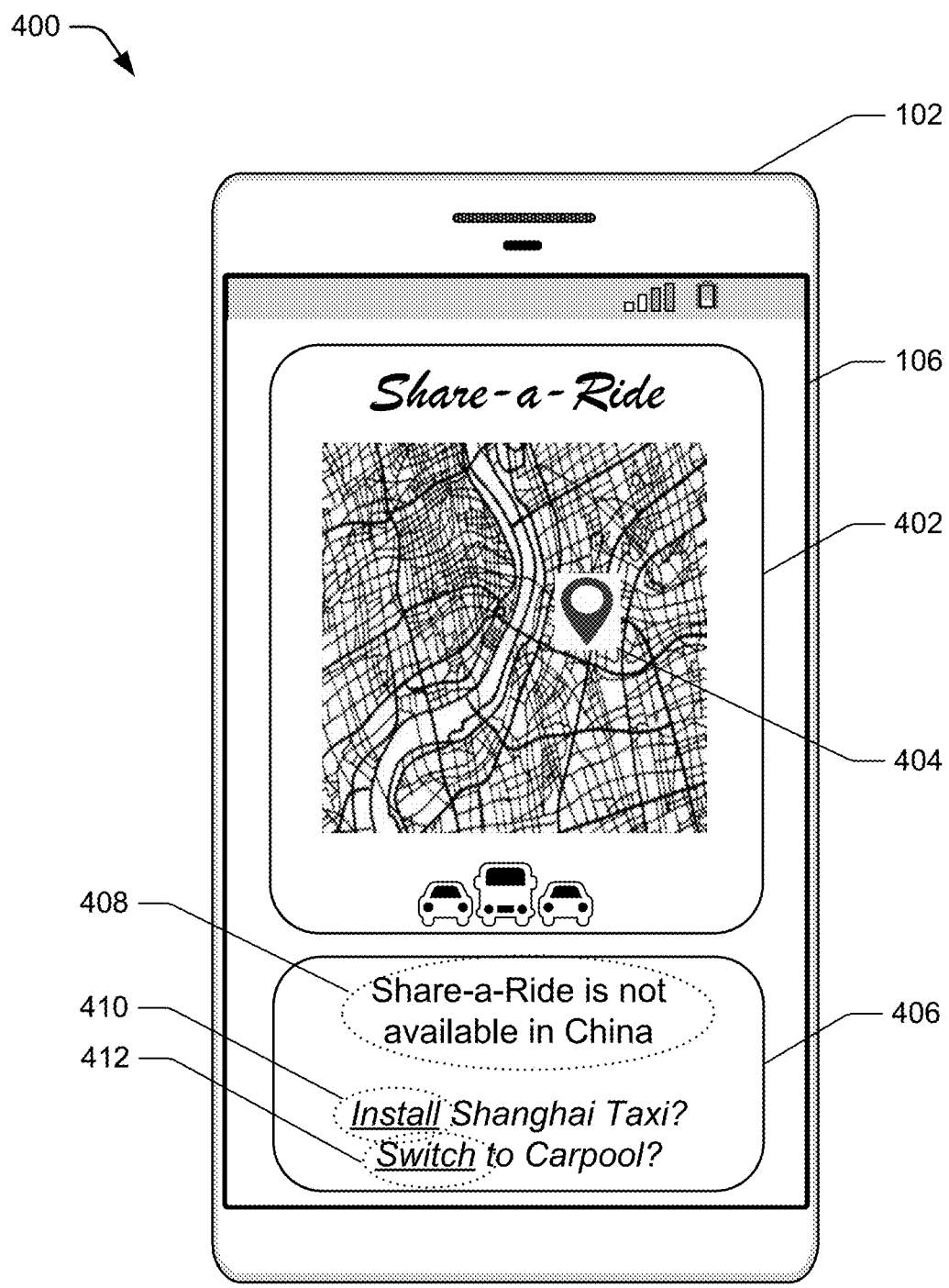
FIG. 4 illustrates an example of details associated with a user device presenting a subset of functionalities associated with a suggested action based on a task a user is performing and various contexts.

FIG. 4 illustrates an example of details 400 associated with a user device presenting a subset of functionalities associated with a suggested action based on a task a user is performing and one or more contexts. The user device may be the user device 102 of FIG. 1. As illustrated in the example of FIG. 4, the user device 102 is using machine learning to determine the context and present the subset of functionalities associated with the suggested action.

The processor 104 executes code associated with the application monitor 112. Based on an application being active (e.g., the Share-a-Ride application presented in the window 402), the user device 102 determines that the user is performing (or desiring to perform) a task of trying to schedule transportation, here via the Share-a-Ride application. However, in this instance and in addition to executing code associated with the application monitor 112, the processor 104 is also executing code associated with the context monitor 114. Based on signal such as a GPS signal or the like that is evaluated by the processor 104 executing the code associated with the application monitor 112, the user device 102 determines a context 404 indicating that it is located at a geolocation of Shanghai, China.

Based on the determined context (e.g., the geolocation of Shanghai, China) surrounding the task (e.g., scheduling transportation via the application Share-a-Ride), the user device 102 (e.g., the processor 104 executing combinations of code or instructions available through the application monitor 112, the context monitor 114, and the one or more applications 116 (including Share-a-Ride)), determines that the current application Share-a-Ride is not available in China and that alternate applications, capable of performing the task, are available.

The processor 104 then executes code associated with the slice module 118 to create a slice 406. However, and as illustrated in this instance, the slice includes notification information 408 (notifying the user that the application Share-a-Ride is not available in China) and also presents options for suggested actions (suggested action 410 to install an application named Shanghai-Taxi or suggested action 412 for the user to switch to the application Carpool).

Note, that in the example of FIG. 4, a suggested action, as associated with another application, is the installation of the other application. In certain instances the user device 102 (e.g., the processor 104 executing combinations of code or instructions available through the application monitor 112, the context monitor 114, and the slice module 118) may perform an installation of the other application after the determination of the suggested action and prior to presenting the slice.

In general, and as part of determining a context, the user device 102 may rely on a variety of techniques. Techniques may rely on sensors of the user device 102 detecting a context surrounding the user device 102 (e.g., a proximity sensor, a light sensor, an infrared sensor, a GPS sensor, a light sensor, a camera, a microphone, a timing sensor, a peripheral device sensor, or the like). Examples of a context surrounding the user device 102 that it might detect itself include a time associated with an activity (e.g., morning and waking up, a morning/evening commute, bed time, or the like), a location (e.g., home, work, airport, gym, or the like), a situation (e.g., in a car, a headphone jack is plugged in, power is plugged in, or the like), or an activity (traveling, running, biking, or the like).

Alternatively or in addition to the user device 102 detecting a context, the techniques may include the user device receiving a context from a device other than the user device. For example, a server or other device remote from the device may provide, to the device, context indicating that a geolocation of the user device 102 is not safe, a low energy beacon may provide context that the user device is near a shopping location, or the like.

Furthermore, determining context may include determining a context surrounding the user, determining a context surrounding another user device, or even determining context surrounding another user. For example, determining a context surrounding the user may include recording historic activities or interactions with applications to help establish interests of the user as well as patterns of behavior. Examples of determining a context surrounding another user device includes evaluating a reliability of a server (e.g., the other user device) providing information to the user device, a location of the server, and so forth. Examples of determining context surrounding another user include communication frequencies from a friend (e.g., the other user), the friend's usage history of the user device 102 or another user device, the friend's historic activities, and so forth.

Figure 5:
FIG. 5 illustrates example of details associated with a user device presenting a subset of functionalities associated with a predicted action based on various contexts.

FIG. 5 illustrates details 500, which are associated with a user device presenting a subset of functionalities associated with a predicted action based on a context. The user device may be the user device 102 of FIG. 1. As illustrated in the example of FIG. 5, the user device 102 is using machine learning to determine a context, analyze an association between the context and other contexts, and predict an action to be performed by the user.

Using sensors or other hardware available to the user device 102 (not illustrated), the user device 102 may use techniques such as facial recognition, voice recognition, radio frequency identifier (RFID) detection, retinal scans, or the like, to associate itself to the user. Alternatively, the user device 102 of the user device may associate itself to the user via the user performing a login to the user device 102. The processor 104 of the user device 102 executes code of the context monitor 114 and the user device 102 determines a context. As illustrated in the example, the context is a context surrounding the user device 102 and is based on a current time (e.g., 10:15 PM).

The processor 104 continues to execute code of the context monitor 114. Through this activity, the user device 102 analyzes an association between the context (e.g., the current time of 10:15 PM) and another context. The other context, in this example, includes a context of activities performed by the user on prior evenings in temporal proximity to 10:15 PM, indicating the user has demonstrated a tendency of reducing a thermostat setting of the house via a home automation application available to the user device 102. In some instances, such an analysis may rely on data that is stored in the CRM 108 of the user device. In other instances, however, the analysis may rely on data that is available to the user device 102 from a remote device (e.g., the remote computing device 120 communicating to the user device 102 via the network 122).

Based on the analysis of the association between the context (e.g., the current time of 10:15 PM) and the other context (e.g., the prior context associating the user to the user device 102 through his tendency to use the home automation application in temporal proximity to 10:15 PM to reduce the thermostat setting), the user device 102 determines a predicted action to be performed by the user via a predicted application (e.g., the user will reduce the thermostat setting via the home automation application).

Continuing the example, the processor 104 of the user device 102 executes code associated with the slice module 118 to interface with the home automation application (even if the home automation application is not launched or active) to present the subset of functionalities associated with the predicted action of setting the thermostat. Although the home automation provides the user with many functionalities (e.g., turning on or off lights, setting an alarm system, or the like), the user device 102 determines a subset of functionalities 502 available through the home automation application are capable of performing the predicted action (e.g., a "set" functionality). The user device 102 then presents a slice 504 that occupies a portion of the display 106. In this instance, the subset of functionalities 502 is presented via the slice 504 presenting a selectable action (e.g., the subset of functionalities 502 of the home automation application corresponding to "set"). Selecting the selectable action, in effect, instructs the home automation application to set the thermostat. Note that the subset of functionalities, while described in the above examples often as one selection, can be more than one. Also, the subset of functionalities can be simply less than all of the functions performable by the application, less than all of the function performable by a particular user interface (e.g., a page of many pages of an internet-enabled application), or a very small number of functions. These functions, as noted, can include, automatically, much or all of the data needed to perform the task.

FIG. 6 illustrates an example method 600 to present a subset of functionalities associated with a suggested action based on content associated with a window of a display of the user device. The method 600 is described in the form of a set of blocks 602-608 that specify operations that can be performed. However, operations are not necessarily limited to the order shown in FIG. 6 or described herein, for the operations may be implemented in alternative orders or in fully or partially overlapping manners. The example method 600 may be performed by the user device 102 of FIG. 1.

At 602, content that is associated with a window occupying a portion of a display of a user device is analyzed. The content may be associated with a window of an application with which a user of the user device is interacting and may include, for example, text content, visual content, or audio content. This analysis may involve textual recognition, image processing, audio processing, or the like.

At 604, a task being performed by the user is identified, such as to create a calendar event, get dinner reservations, open an email, and so forth. At 606, and based on the task, a suggested action to be performed by a second application is determined. The second application may be stored in a computer-readable storage media that is local to the user device or stored in a computer-readable storage media that is remote from the user device. Furthermore, the second application may be dormant, executing in the background, or otherwise unlaunched and, as such, effectively hidden from viewing by the user. As noted, determining the suggested action does not require an installed instantiation of an application by which to perform the action or task.

At 608, and based on the suggested action, a subset of functionalities of the second application that are capable of performing the suggested action are determined. At 610, the subset of functionalities is presented through a user interface through which to instruct the second application to perform the subset of functionalities. The user interface, in certain instances, may be a limited-function user interface. The user interface may also occupy another portion of the display that is either (i) separate from the portion of the display occupied by the window of the application or (ii) overlapping the portion of the display occupied by the window of the application.

Figure 7:
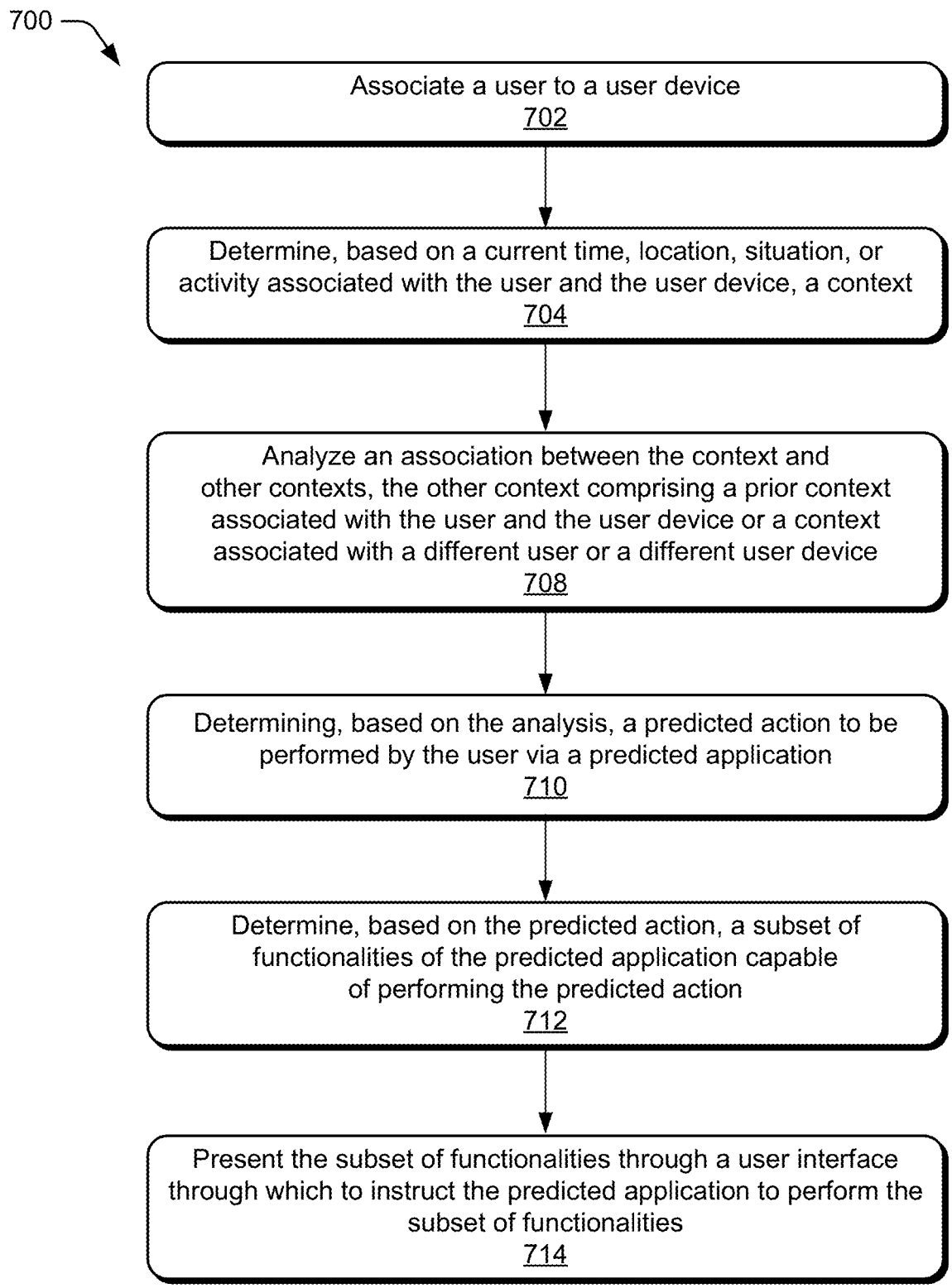
FIG. 7 illustrates an example method to present a subset of functionalities associated with a predicted action based on various contexts.

FIG. 7 illustrates an example method 700 to present a subset of functionalities associated with a predicted action based on a context. The method 700 is described in the form of a set of blocks 702-714 that specify operations that can be performed. However, operations are not necessarily limited to the order shown in FIG. 7 or described herein, for the operations may be implemented in alternative orders or in fully or partially overlapping manners. The example method 700 may be performed by the user device 102 of FIG. 1.

At 702, a user is associated to a user device. Such an association may be based on a facial recognition of the user, a voice recognition of the user, a radio frequency identifier (RFID) tag associated with the user, a retinal scan of the user, a login performed by the user, or the like.

At 704, a context is determined. The determination may be based on a current time, location, situation, or activity associated with the user and the user device. The determination may rely, at least in part, on signals received from sensors of the user device, such as a proximity sensor, an infrared sensor, a GPS sensor, a light sensor, a camera, a microphone, or a peripheral device sensor. The determination may also rely, at least in part, on a context received from another user device.

At 708, an association between the context and other contexts is analyzed. The other context may comprise a prior context associated with the user and the user device or a context associated with a different user or a different user device. The prior context associated with the user and the user device may, in some instances, be stored in computer-readable storage media that is part of the user device while in other instances the prior context associated with the user and the user device may be received from a user device that is other than the user device.

At 710, and based on the analysis, a predicted action to be performed by the user via a predicted application is determined. At 712 and based on the predicted action, a subset of functionalities of the predicted application capable of performing the predicted action is determined. Furthermore, the predicted application may be dormant, executing in the background, or otherwise unlaunched and, as such, effectively hidden from viewing by the user.

At 714, the subset of functionalities is presented through a user interface through which to instruct the second application to perform the subset of functionalities. The user interface, in certain instances, may be a limited-function user interface. The user interface may also occupy another portion of the display that is either (i) separate from the portion of the display occupied by the window of the application or (ii) overlapping the portion of the display occupied by the window of the application.

Permutations and variations of method 600 and method 700 are permitted by the techniques. For example, as part of method 600, determining the suggested action to be performed via the second application can be further based on a context associated to the user or the user device. Conversely, and as another example as part of the method 700, determining the predicted action to be performed via the predicted application can be further based on analyzed content that is associated with a window occupying a portion of the display of the user device.

In general, machine learning for suggesting and predicting actions can be extended in a heuristic fashion sufficient to enable a user to perform any of a number of immediate tasks. Media (via a music, a video, an audio, or a book applications) can be presented or resumed, briefings (via a calendar, a personal assistant, or a news and media messaging application) can be easily accessed, transportation (via a carrier application), or entertainment (via a theater application or amusement park application) are but a few examples.

Although techniques using, and apparatuses for implementing suggesting actions based on machine learning have been described, it is to be understood that the subject of the appended claims is not necessarily limited to the specific features or methods described. Rather, the specific features and methods are disclosed as example ways in suggesting actions based on machine learning can be implemented.

The aforementioned techniques are furthermore configurable to satisfy privacy or confidentiality preferences of a user. For example, a user may simply choose to not enable a machine-learning module installed on a computing device. Alternatively, a user may select or block specific applications from being accessed by the machine-learning module. In general, the user may be provided with tools to control the use of the user's personal information.

What is claimed is:

1. A method comprising:
displaying first content in a window occupying a portion of a display of a user device, the first content including at least one of text content, image content, or video content, the window associated with a first application with which a user is interacting;
displaying a subset of functionalities of a second application through a slice window, the subset of functionalities comprising a suggested action to be performed by the user based on the first content and via the second application, the slice window occupying a portion of the display and including one or more selectable controls through which to instruct the second application to perform the subset of functionalities; and
responsive to receiving a selection of the one or more selectable controls by the user, displaying second content, the second content including a result of the second application performing the suggested action.

2. The method of claim 1, wherein displaying the second content comprises displaying the second content in another window occupying at least a portion of the display of the user device.

3. The method of claim 2, wherein the other window comprises another slice window.

4. The method of claim 2, wherein the other window is associated with the second application.

5. The method of claim 1, wherein:
the second application comprises a calendar application;
the suggested action comprises at least one of creating an event, modifying an event, creating a contact list entry, or modifying a contact list entry; and
the second content comprises at least a portion of the first content.

6. The method of claim 1, wherein:
the first application comprises a media application; and
the suggested action comprises at least one of purchasing media or purchasing a ticket to a media event.

7. The method of claim 1, wherein:
the first application comprises a social media application;
the suggested action comprises contacting an individual; and
the second application comprises at least one of another social media application, an email application, or a messaging application.

8. The method of claim 1, wherein:
the suggested action comprises at least one of translating text, translating audio content, converting currency, reading text-to-speech, autofilling passwords, capturing an image, or providing codes.

9. The method of claim 1, wherein the slice window is a limited-function user interface for the second application.

10. The method of claim 1, the method further comprising:
launching the second application on the user device, wherein the slice window includes content associated with the at least one of text content, image content, or video content and the suggested action.

11. The method of claim 1, wherein determining the suggested action to be performed is further based on a context associated to the user or the user device.

12. An apparatus comprising:
a display;
a processor; and
computer-readable storage media storing instructions that, upon execution by the processor, cause the apparatus to:
display first content in a window occupying a portion of the display, the first content including at least one of text content, image content, or video content, the window associated with a first application;
display a subset of functionalities of a second application through a slice window, the subset of functionalities comprising a suggested action to be performed based on the first content and via the second application, the slice window occupying a portion of the display and including one or more selectable controls through which to instruct the second application to perform the subset of functionalities; and
responsive to receiving a selection of the one or more selectable controls by a user, display second content, the second content including a result of the second application performing the suggested action.

13. The apparatus of claim 12, the computer-readable storage media storing further instructions that, upon execution by the processor to display the second content, cause the apparatus to:
display the second content in another window occupying at least a portion of the display.

14. The apparatus of claim 13, wherein the other window comprises another slice window.

15. The apparatus of claim 13, wherein the other window is associated with the second application.

16. The apparatus of claim 12, wherein:
the second application comprises a calendar application;
the suggested action comprises at least one of creating an event, modifying an event, creating a contact list entry, or modifying a contact list entry; and
the second content comprises at least a portion of the first content.

17. The apparatus of claim 12, wherein:
the first application comprises a media application; and
the suggested action comprises at least one of purchasing media or purchasing a ticket to a media event.

18. The apparatus of claim 12, wherein:
the first application comprises a social media application;
the suggested action comprises contacting an individual; and
the second application comprises at least one of another social media application, an email application, or a messaging application.

19. The apparatus of claim 12, wherein:
the suggested action comprises at least one of translating text, translating audio content, converting currency, reading text-to-speech, autofilling passwords, capturing an image, or providing codes.

20. A method comprising:
displaying first content in a window occupying a portion of a display of a user device, the first content including at least one of text content, image content, or video content, the window associated with a first application with which a user is interacting;
displaying a subset of functionalities of a second application through a slice window, the subset of functionalities comprising a suggested action to be performed by the user via the second application and based on the first content and an association between a context associated with the user or the user device, the context based on a current time, location, situation, sensor data, or activity associated with the user or the user device, the slice window occupying a portion of the display and including one or more selectable controls through which to instruct the second application to perform the subset of functionalities; and
responsive to receiving a selection of the one or more selectable controls by the user, displaying second content, the second content including a result of the second application performing the suggested action.

* * * * *